United States Patent
Boriskovsky et al.

(10) Patent No.: US 9,529,706 B1
(45) Date of Patent: Dec. 27, 2016

(54) SYSTEM, METHOD, AND COMPUTER PROGRAM FOR PERFORMING SOFTWARE APPLICATION OPERATIONS CONCURRENTLY WITH MEMORY COMPACTION OPERATIONS

(71) Applicant: Amdocs Software Systems Limited, Dublin (IE)

(72) Inventors: Victoria Boriskovsky, Kfara Saba (IL); Michael Goltsman, Beer Sheva (IL); Vladimir Polonsky, Ramat Gan (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 245 days.

(21) Appl. No.: 14/290,739

(22) Filed: May 29, 2014

(51) Int. Cl.
*G06F 12/02* (2006.01)

(52) U.S. Cl.
CPC ......... *G06F 12/023* (2013.01); *G06F 12/0253* (2013.01); *G06F 2212/702* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 5,293,614 A * | 3/1994 | Ferguson | ............ | G06F 12/0269 |
| 7,653,793 B1 * | 1/2010 | Garthwaite | ......... | G06F 12/0269 711/159 |
| 9,122,588 B1 * | 9/2015 | Mondal | ............... | G06F 12/0246 |
| 2011/0264713 A1 * | 10/2011 | Ylonen | ............... | G06F 12/0269 707/818 |
| 2011/0264870 A1 * | 10/2011 | Ylonen | ............... | G06F 12/0261 711/154 |

OTHER PUBLICATIONS

Pizlo, et al. "Stopless: a real-time garbage collector for multiprocessors," Oct. 2007, ISMM '07 Proceedings of the 6th international symposium on Memory management, pp. 159-172.*

* cited by examiner

Primary Examiner — Michael Krofcheck
(74) Attorney, Agent, or Firm — Zilka-Kotab, PC

(57) ABSTRACT

A system, method, and computer program product are provided for performing software application operations concurrently with memory compaction operations. In use, one or more memory blocks to optimize utilizing a memory compaction operation are identified. Additionally, one or more data objects associated with the one or more memory blocks are identified, the one or more data objects being a portion of a plurality of data objects in a memory capable of being access by a software application. Further, the memory compaction operation is initiated utilizing a request including business related information associated with the one or more data objects. Moreover, an application flow of the software application is modified such that the one or more data objects are not accessed by the software application during the memory compaction operation, and the plurality of objects not associated with the one or more memory blocks are capable of being accessed by the software application during the memory compaction operation and are not processed as part of the memory compaction operation.

16 Claims, 4 Drawing Sheets

SYSTEM, METHOD, AND COMPUTER PROGRAM FOR PERFORMING SOFTWARE APPLICATION OPERATIONS CONCURRENTLY WITH MEMORY COMPACTION OPERATIONS

FIELD OF THE INVENTION

The present invention relates to memory systems, and more particularly to efficiently performing memory compaction on such memory systems.

BACKGROUND

In the context of memory systems, defragmentation refers to a process that reduces the amount of fragmentation in memory. Part of this process includes creating larger regions of free space using compaction to impede the return of fragmentation.

Existing memory compaction algorithms work independently from application logic. These compaction algorithms rely on information about an application object's lifetime that the algorithms are able to obtain from the memory manager. In these cases, the determination of when memory compacting should be performed is an estimate.

Additionally, because memory compacting code algorithms cannot predict the future use of an object, the algorithms must block access to that object whose memory is being compacted. In other words, typically, there is no way to avoid memory compacting interference with application flow, thereby resulting in significant performance degradation during the compaction.

There is thus a need for addressing these and/or other issues associated with the prior art.

SUMMARY

A system, method, and computer program product are provided for performing software application operations concurrently with memory compaction operations. In use, one or more memory blocks to optimize utilizing a memory compaction operation are identified. Additionally, one or more data objects associated with the one or more memory blocks are identified, the one or more data objects being a portion of a plurality of data objects in a memory capable of being access by a software application. Further, the memory compaction operation is initiated utilizing a request including business related information associated with the one or more data objects. Moreover, an application flow of the software application is modified such that the one or more data objects are not accessed by the software application during the memory compaction operation, and the plurality of objects not associated with the one or more memory blocks are capable of being accessed by the software application during the memory compaction operation and are not processed as part of the memory compaction operation.

DETAILED DESCRIPTION

Figure 1:
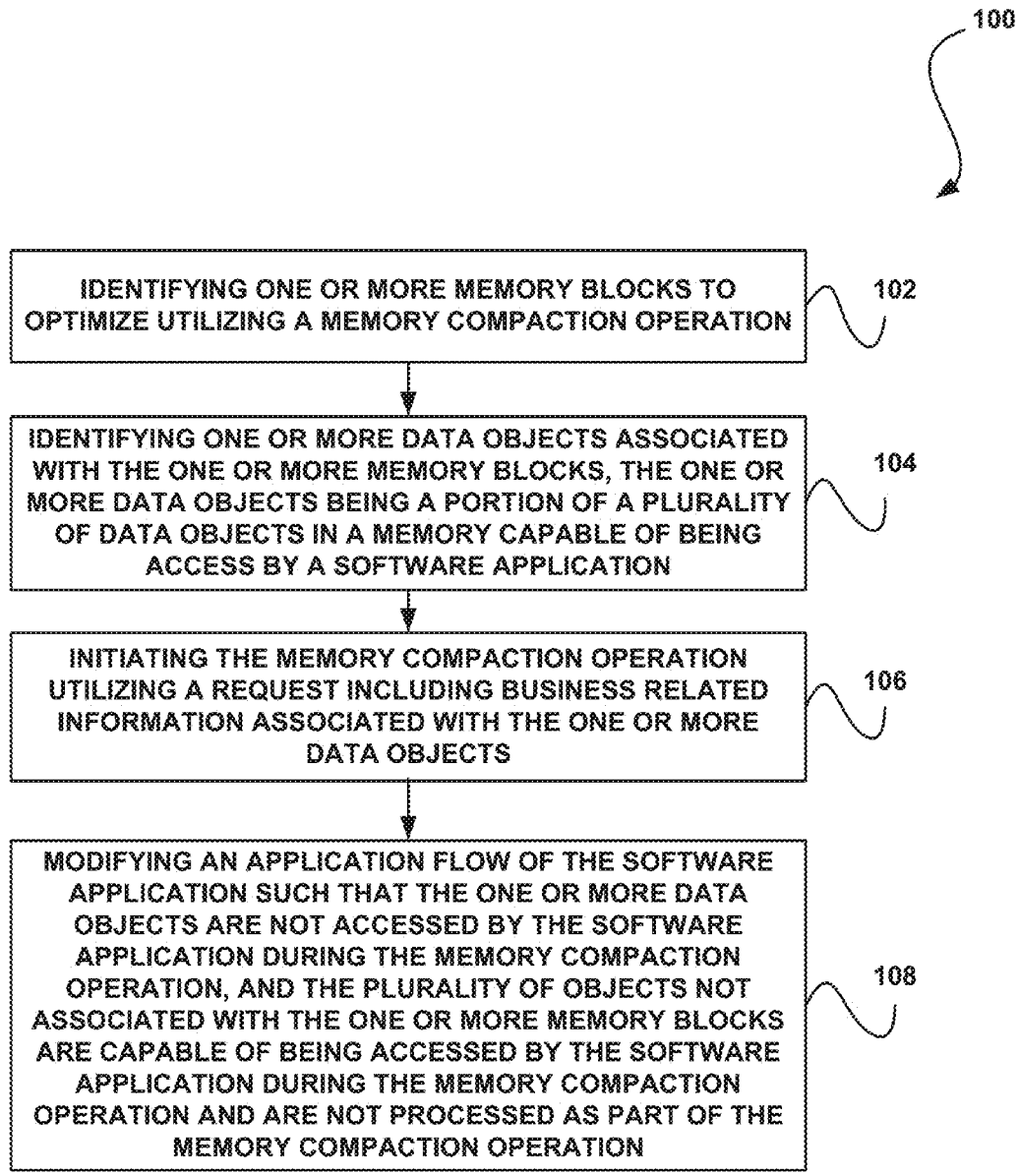
FIG. 1 illustrates a method for performing software application operations concurrently with memory compaction operations, in accordance with one embodiment.

FIG. 1 illustrates a method 100 for performing software application operations concurrently with memory compaction operations, in accordance with one embodiment.

As shown, one or more memory blocks to optimize utilizing a memory compaction operation are identified. See operation 102. In the context of the present description, a memory compaction operation refers to any operation utilized to resolve memory fragmentation and/or otherwise function to compact an identified memory block. For example, the memory compaction operation may include a garbage collection operation, where the garbage collection operation refers to an operation that removes objects in memory that are no longer in use.

In various embodiments, identifying the memory blocks to optimize may include detection of the memory blocks to optimize and/or voluntary assignment of the memory blocks to optimize. Furthermore, the compaction operation may be done at any time, even if there is no fragmentation.

Additionally, one or more data objects associated with the one or more memory blocks are identified, the one or more data objects being a portion of a plurality of data objects in a memory capable of being accessed by a software application. See operation 104. The data objects may include any data capable of being utilized by the software application. Further, the software application may include any type of software application.

As shown further in FIG. 1, the memory compaction operation is initiated utilizing a request including business related information associated with the one or more data objects. See operation 106.

The business related information may include any information associated with the data objects. In one embodiment, the business related information associated with the one or more data objects may not be associated with size of the one or more data objects, such that data objects with the same size are distinguishable.

In one embodiment, the software application may determine the business related information associated with the one or more data objects. Additionally, the software application may initiate the memory compaction operation.

Moreover, an application flow of the software application is modified such that the one or more data objects are not accessed by the software application during the memory compaction operation, and the plurality of objects not associated with the one or more memory blocks are capable of being accessed by the software application during the memory compaction operation and are not processed as part of the memory compaction operation. See operation 108. The software application may be allowed to access the one or more data objects from the one or more memory blocks, upon completion of the memory compaction operation.

In this way, software application operations associated with the software application may be performed concurrently with performing the memory compaction operation, without performance degradation.

In one embodiment, the one or more memory blocks may include allocated memory blocks of the memory that are associated with the business related information placed in common memory regions. Further, in one embodiment, the request including the business related information associated with the data objects may be received by a memory manger. In this case, the business related information may be provided as an input parameter to the memory manger.

In one embodiment, the memory compaction operation may include the memory manager allocating new memory blocks with attributes associated with the one or more memory blocks. In this case, the memory compaction operation may further include the memory manager copying data from the one or more memory blocks to the memory blocks and releasing the one or more memory blocks for memory compaction.

In another embodiment, the memory compaction operation may include the software application allocating new memory blocks with attributes associated with the one or more memory blocks. In this case, the memory compaction operation may further include the software application copying data from the one or more memory blocks to the memory blocks and releasing the one or more memory blocks for memory compaction.

In another embodiment, an external memory that is separate from the memory may be utilized to facilitate the memory compaction operation. For example, the plurality of data objects including the one or more data objects may be stored in the memory and the external memory (e.g. the memories may be synchronized, etc.). In this case, the memory compaction operation may include releasing the memory for memory compaction and utilizing the external memory for performing tasks associated with the software application.

Data stored in the external memory may be copied to the memory, upon completion of the memory compaction operation. Furthermore, the memory may be utilized for performing tasks associated with the software application upon copying the data stored in the external memory to the memory.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
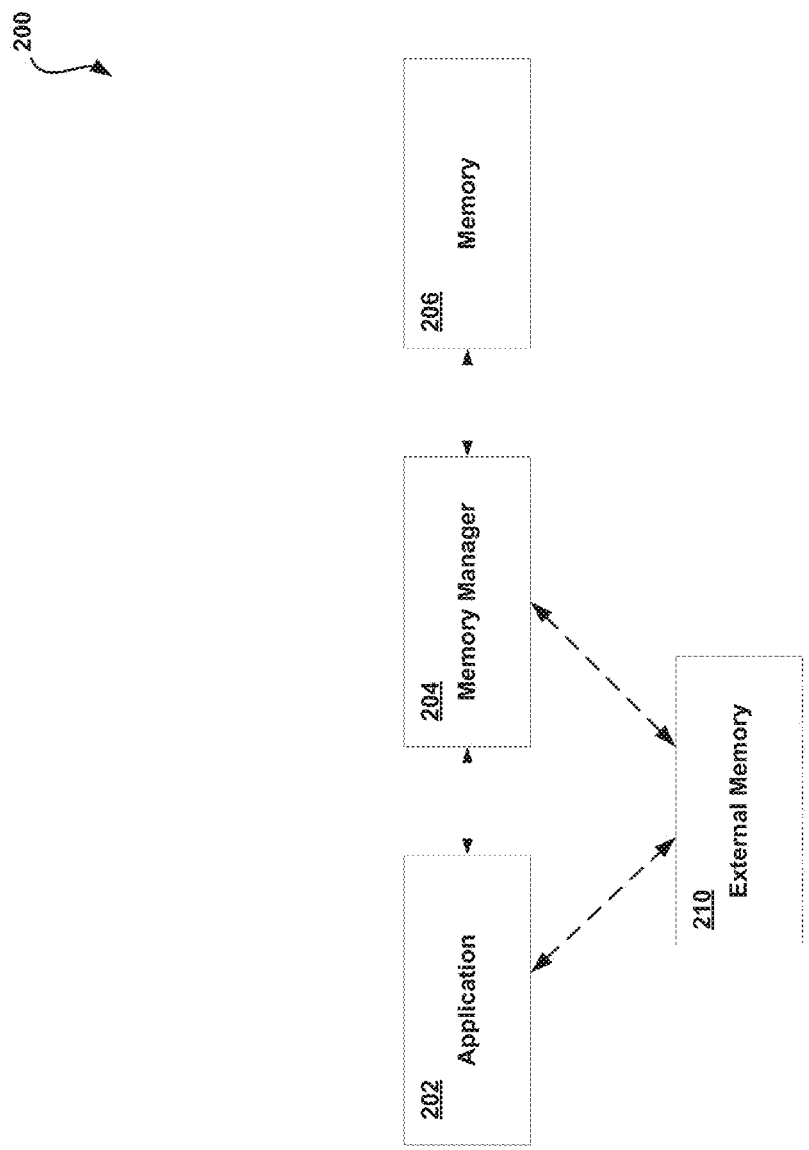
FIG. 2 illustrates a block diagram of a system for performing software application operations concurrently with memory compaction operations, in accordance with one embodiment.

FIG. 2 illustrates a block diagram of a system 200 for performing software application operations concurrently with memory compaction operations, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown in FIG. 2, a software application 202 is in communication with a memory manager 204 and a memory 206. In one embodiment, the software application 202 and/or the memory manager 204 may also be in communication with external memory 210.

In operation, the system 200 may function to implement a concurrent garbage collector method to resolve memory fragmentation problems of the memory 206, without interrupting data processing of the application 202, using application knowledge in the decision of when to perform the garbage collection, and the scope in which it will be applied.

In one embodiment, this method may operate to modify the software memory manager 204 by adding business related information (BRI) to an allocation call, and allowing the applicative layer to control the garbage collection by adding a specific API call (e.g. COMPACT), accepting business related information as one of its parameters.

In this case, various business related information may be independent from an application viewpoint, meaning they may be defined in such a way that processing using information from one business related information (or data object) does not impact other business related information. Such partitioning exists in many systems dealing with customers, zones, and various other factors of the relevant population.

In order to accomplish this, in one embodiment, the application code may supply business related information, not related to size, at a memory allocation moment, thus allowing the memory manager 204 to distinguish this particular allocation from other business related information (or data objects) of the same size.

All allocated memory blocks with the same business related information may be placed in common memory regions. In this case, no region may be allowed to contain memory blocks with different business related information. The application code may be modified in a way that ensures that memory blocks with different business related information may be processed independently.

When it is determined that garbage collection is required, the application 202 stops processing application data with specific business related information (i.e. specific data objects), initiates the compaction operation, provides the specific business related information as input parameter, waits until the compaction operation finishes, and resumes processing of the data with this business related information. The application 202 continues processing data with all other business related information while waiting for the compaction operation to finish.

In various embodiments, the memory compacting may be accomplished utilizing various techniques. For example, in one embodiment, the memory manager 204 may allocate new memory blocks with the same attributes as existing memory blocks, copy data from the existing memory blocks to the new memory blocks, and release the old memory blocks for compaction.

In another embodiment, the application 202 may allocate new memory blocks with the same attributes as the existing memory blocks, copy data from the existing memory blocks to the new memory blocks, and release the old memory blocks for compaction.

In another embodiment, instead of copying data inside the memory 206, the external storage 210 may be used for memory compaction. In this case, the flow may include storing (or keeping in sync) the application data in the external storage 210, releasing the memory 206 for compaction, allocating the new memory, and loading the data from the external storage 210.

As a specific example, such technique may be used to address memory fragmentation that occurs at runtime of an event server (ES) process. An event server may keep data in a shared memory segment of a fixed size. The segment may be created when an event server starts and may not be enlarged at a later time.

The data kept in the segment may be split into blocks that have a tendency to grow. This may lead to the creation of many old small blocks that cannot be reused since new blocks have a larger size. In the long run, the entire memory segment may become divided into blocks of improper sizes, such that new blocks cannot be created and the event server stops working.

An event server may have a flow managing mechanism that ensures that only one event per customer can be processed at a time. In addition, in one embodiment, the event server may have access to an external storage, such as an In-Memory Data Grid (IMDG). In this case, it may be guaranteed that the contents of the external storage are consistent and can be put inside the shared memory segment at any point, replacing its contents without any data loss.

Accordingly, in one embodiment, a system administrator may start the compaction procedure by sending a specific command to an application, such as an Availability Manager. Upon receiving that administrator's command, the Availability Manger may send the memory compaction command to all running event servers.

Upon receiving the command from the Availability Manager, each event server may generate a list of existing customers and send a compaction command to every one of the customers via an internal queue. A customer may include several subscribers and, therefore, may send a number of compaction events (one per subscriber).

When a processing unit of the event server receives the compaction command for a subscriber, it may delete all the subscriber data from the memory, thus allowing the compaction, and load the data again from the external memory (e.g. the IMDG). Since only this customer is affected and all others are not, the event server is not interrupted and the external systems are not affected in any way.

Thus, the techniques described herein may be utilized to facilitate shared control over the memory compacting between the memory manager 204 and the application 202. While the memory manager 204 may perform the compacting and memory rearrangement, the application 202 may decide when to act and what object/area should be optimized. This allows the modification of application flow in a way that the objects being processed by memory compacting are not accessed by the application 202 and the objects being processed by the application 202 are not touched by the memory compacting. This enables concurrent execution of compaction without holding and locking the application 202, and results with a continuous and smooth operation of both components.

Figure 3:
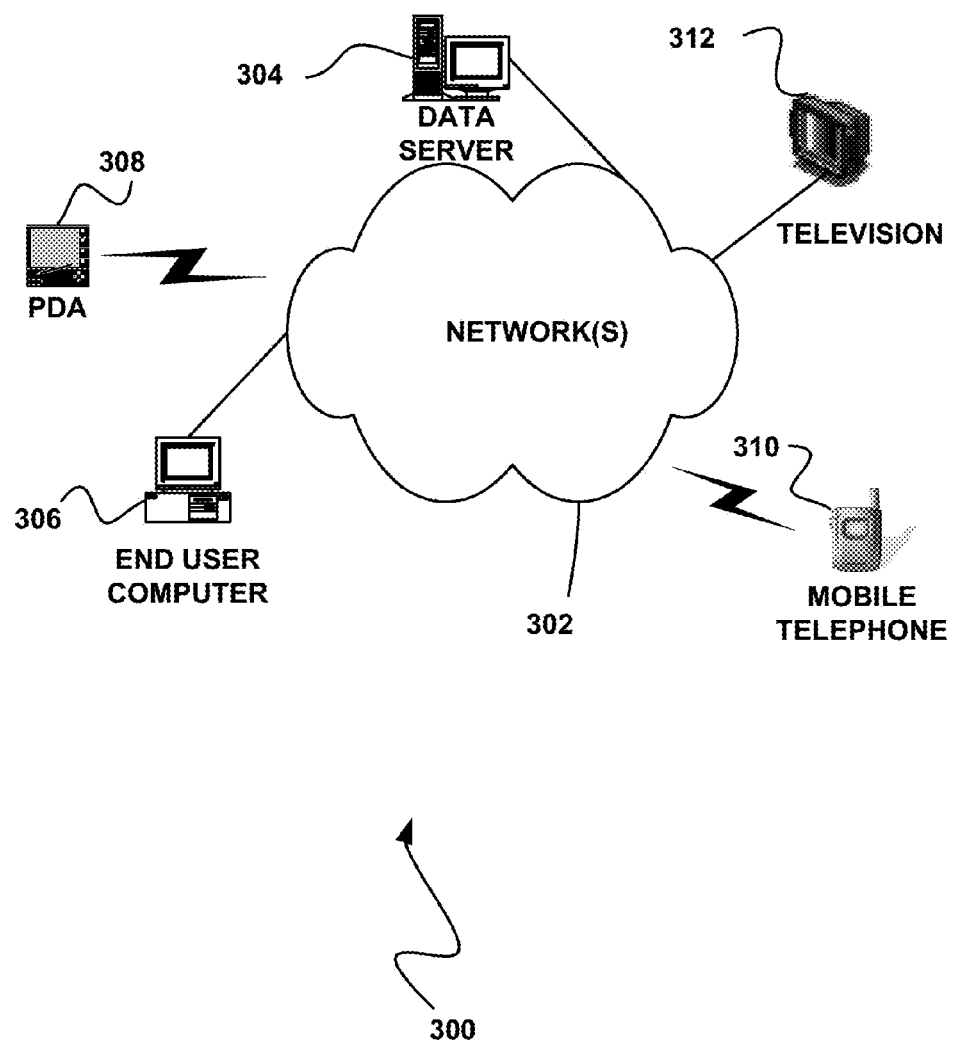
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
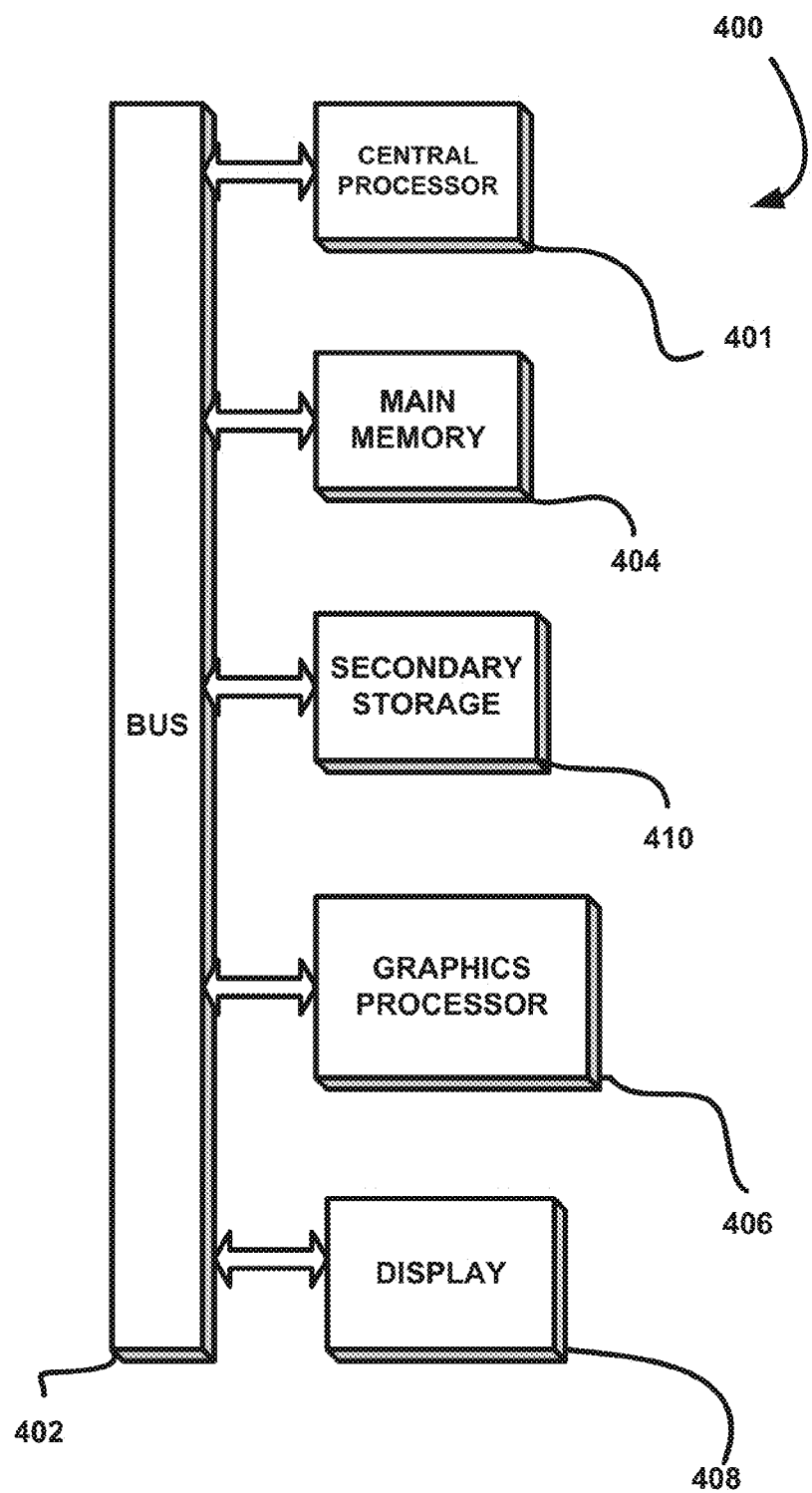
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    computer code for identifying one or more memory blocks to optimize utilizing a memory compaction operation;
    computer code for identifying one or more data objects associated with the one or more memory blocks, the one or more data objects being a portion of a plurality of data objects in a memory capable of being accessed by a software application;
    computer code for initiating the memory compaction operation utilizing a request including business related information associated with the one or more data objects; and
    computer code for modifying an application flow of the software application such that the one or more data objects are not accessed by the software application during the memory compaction operation, and one or more data objects of the plurality of objects that are not associated with the one or more memory blocks are capable of being accessed by the software application during the memory compaction operation and are not processed as part of the memory compaction operation;
    wherein the computer program product is operable such that an external memory that is separate from the memory is utilized to facilitate the memory compaction operation and the plurality of data objects including the one or more data objects are stored in the memory and the external memory;
    wherein the memory compaction operation releases the memory for memory compaction and utilizes the external memory for performing tasks associated with the software application, and wherein data stored in the external memory is copied to the memory, upon completion of the memory compaction operation.

2. The computer program product of claim 1, further comprising computer code for performing software application operations associated with the software application concurrently with performing the memory compaction operation.

3. The computer program product of claim 1, wherein the computer program product is operable such that the software application initiates the memory compaction operation and the memory compaction operation initiation includes the business related information.

4. The computer program product of claim 1, wherein the computer program product is operable such that the software application determines the business related information associated with the one or more data objects.

5. The computer program product of claim 1, wherein the computer program product is operable such that the business related information associated with the one or more data objects is not associated with a size of the one or more data objects.

6. The computer program product of claim 1, wherein the computer program product is operable such that the one or more memory blocks include allocated memory blocks of the memory that are associated with the business related information placed in common memory regions.

7. The computer program product of claim 1, wherein the computer program product is operable such that the request including the business related information associated with the one or more data objects is received by a memory manger.

8. The computer program product of claim 7, wherein the computer program product is operable such that the business related information is provided as an input parameter to the memory manger.

9. The computer program product of claim 7, wherein the computer program product is operable such that the memory compaction operation includes the memory manager allocating new memory blocks with attributes associated with the one or more memory blocks.

10. The computer program product of claim 9, wherein the computer program product is operable such that the memory compaction operation further includes the memory manager copying data from the one or more memory blocks to the new memory blocks and releasing the one or more memory blocks for memory compaction.

11. The computer program product of claim 1, wherein the computer program product is operable such that the memory compaction operation includes the software application allocating new memory blocks with attributes associated with the one or more memory blocks.

12. The computer program product of claim 11, wherein the computer program product is operable such that the memory compaction operation further includes the software application copying data from the one or more memory blocks to the new memory blocks and releasing the one or more memory blocks for memory compaction.

13. The computer program product of claim 1, wherein the computer program product is operable such that the memory is utilized for performing tasks associated with the software application upon copying the data stored in the external memory to the memory.

14. The computer program product of claim 1, further comprising computer code for allowing the software application to access the one or more data objects from the one or more memory blocks, upon completion of the memory compaction operation.

15. A method, comprising:
identifying one or more memory blocks to optimize utilizing a memory compaction operation;
identifying one or more data objects associated with the one or more memory blocks, the one or more data objects being a portion of a plurality of data objects in a memory capable of being accessed by a software application;
initiating the memory compaction operation utilizing a request including business related information associated with the one or more data objects; and
modifying an application flow of the software application such that the one or more data objects are not accessed by the software application during the memory compaction operation, and one or more data objects of the plurality of objects that are not associated with the one or more memory blocks are capable of being accessed by the software application during the memory compaction operation and are not processed as part of the memory compaction operation;
wherein the computer program product is operable such that an external memory that is separate from the memory is utilized to facilitate the memory compaction operation and the plurality of data objects including the one or more data objects are stored in the memory and the external memory;
wherein the memory compaction operation releases the memory for memory compaction and utilizes the external memory for performing tasks associated with the software application, and wherein data stored in the external memory is copied to the memory, upon completion of the memory compaction operation.

16. A system comprising:
a memory system; and
one or more processing cores coupled to the memory system and that are each configured to:
identify one or more memory blocks to optimize utilizing a memory compaction operation;
identify one or more data objects associated with the one or more memory blocks, the one or more data objects being a portion of a plurality of data objects in a memory capable of being accessed by a software application;
initiate the memory compaction operation utilizing a request including business related information associated with the one or more data objects; and
modify an application flow of the software application such that the one or more data objects are not accessed by the software application during the memory compaction operation, and one or more data objects of the plurality of objects that are not associated with the one or more memory blocks are capable of being accessed by the software application during the memory compaction operation and are not processed as part of the memory compaction operation;
wherein the computer program product is operable such that an external memory that is separate from the memory is utilized to facilitate the memory compaction operation and the plurality of data objects including the one or more data objects are stored in the memory and the external memory;
wherein the memory compaction operation releases the memory for memory compaction and utilizes the external memory for performing tasks associated with the software application, and wherein data stored in the external memory is copied to the memory, upon completion of the memory compaction operation.

* * * * *